May 19, 1925. 1,538,122
J. C. KURTZ ET AL
WEIGHING AND SORTING MACHINE
Filed Feb. 2, 1922 3 Sheets-Sheet 3
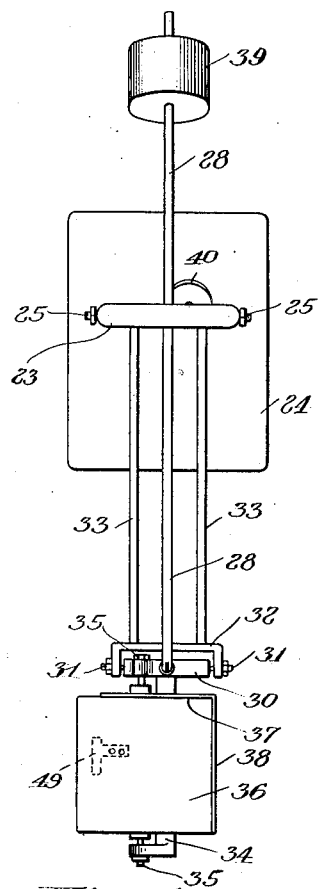
Fig. 4
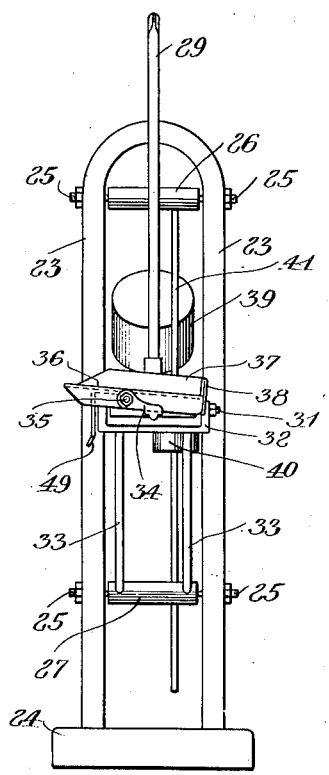
Fig. 5
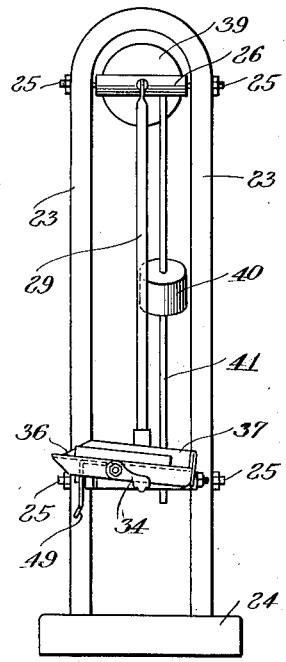
Fig. 6
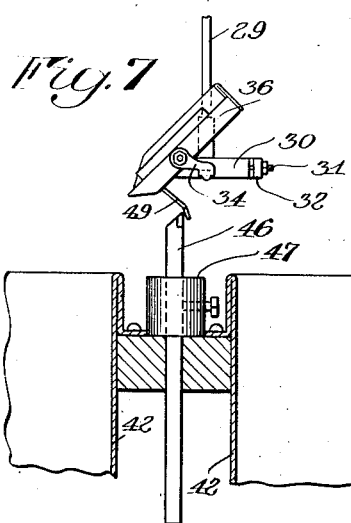
Fig. 7
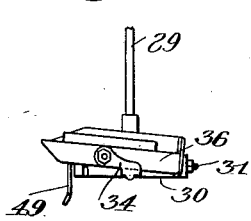
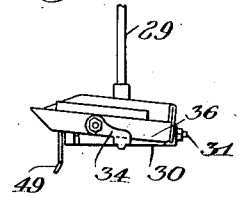
INVENTORS
John C. Kurtz
Joseph J. McCabe
BY
their ATTORNEY Patented May 19, 1925.

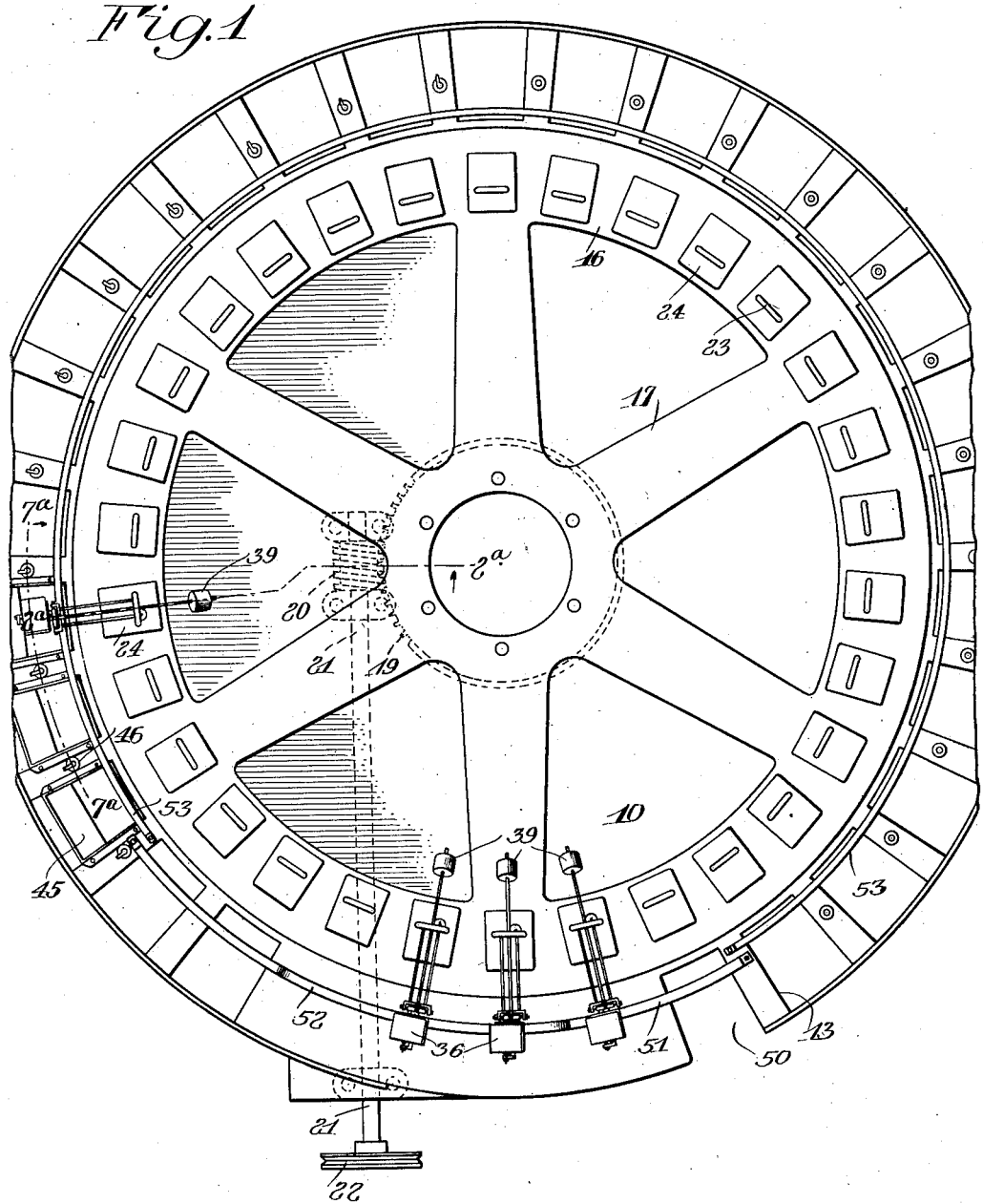

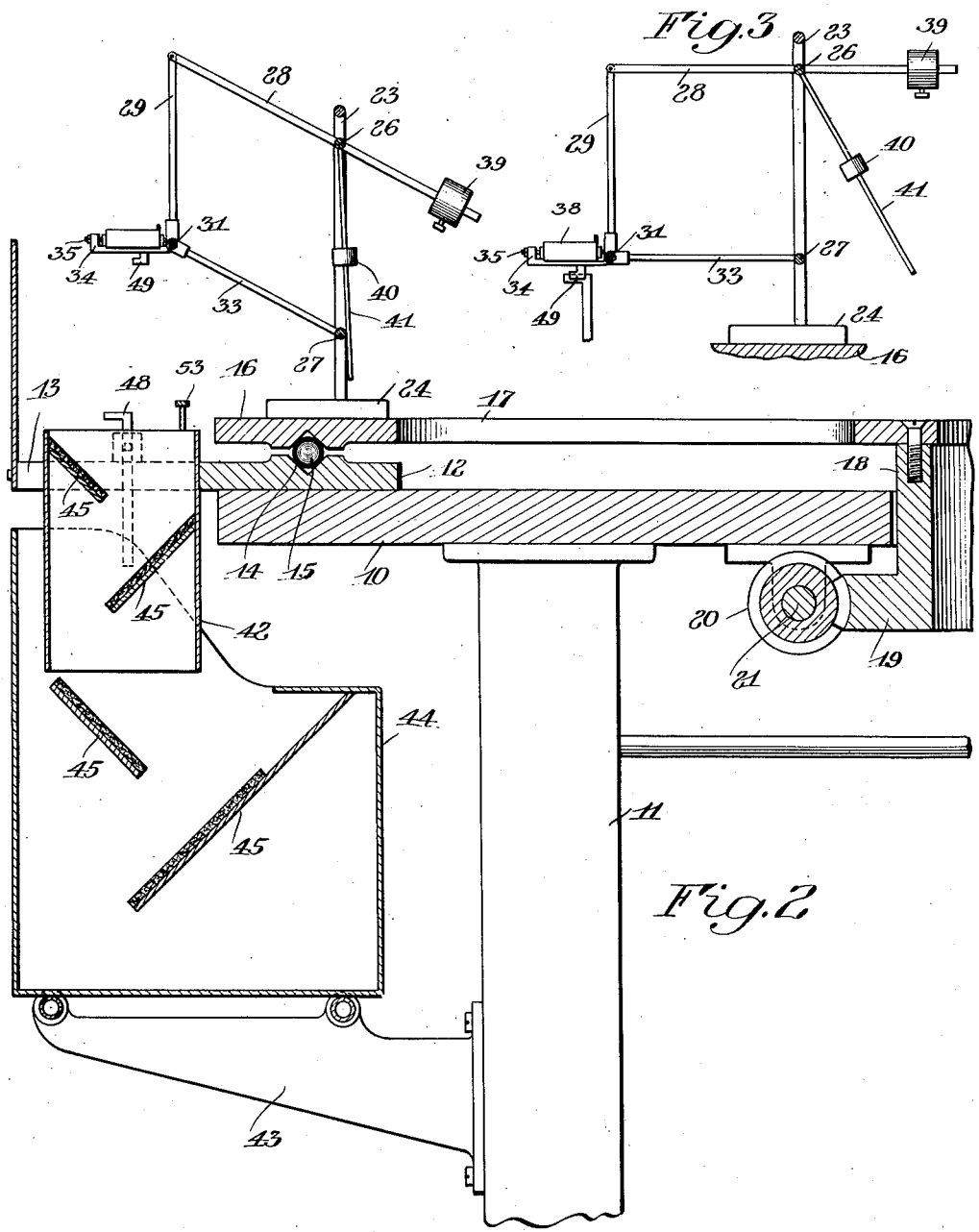

1,538,122

UNITED STATES PATENT OFFICE.

JOHN C. KURTZ AND JOSEPH J. McCABE, OF ROCHESTER, NEW YORK, ASSIGNORS TO BAUSCH & LOMB OPTICAL COMPANY, OF ROCHESTER, NEW YORK, A CORPORATION OF NEW YORK.

WEIGHING AND SORTING MACHINE.

Application filed February 2, 1922. Serial No. 533,565.

*To all whom it may concern:*

Be it known that we, JOHN C. KURTZ and JOSEPH J. McCABE, of Rochester, in the county of Monroe and State of New York, have invented certain new and useful Improvements in Weighing and Sorting Machines; and we do hereby declare the following to be a full, clear, and exact description of the same, reference being had to the accompanying drawings, forming a part of this specification, and to the reference numerals marked thereon.

This invention relates to the separation or sorting of material or articles with reference to the weight of the same and more particularly to machines for automatically weighing portions of material or articles and sorting the latter according to the weight thereof, the chief object of the invention being to provide a simply and practically constructed machine of the above character capable of functioning in an accurate, reliable and rapid manner and therefore economical to manufacture and operate. To these and other ends the invention resides in certain improvements and combinations of parts all as will hereinafter be more fully described, the novel features being pointed out in the claims at the end of the specification.

In the drawings:

Figure 1 is a top plan view of a machine embodying the present invention, partly broken away and with duplicate parts omitted;

Figure 2 is an enlarged sectional elevation of a portion of the same substantially on the line 2ª—2ª of Figure 1;

Figure 3 is a sectional elevation of a weighing mechanism as illustrated in Figure 2, but showing the parts in a different position;

Figure 4 is an enlarged top plan view of a weighing mechanism detached;

Figures 5 and 6 are front elevations of the same, showing the parts in different positions;

Figure 7 is a sectional elevation substantially on the line 7ª—7ª of Figure 1, illustrating the mode of operation.

Similar reference numerals throughout the several views indicate the same parts.

The embodiment of the invention selected for the purposes of the present disclosure as best illustrating the principles involved shows an application of the invention to the purpose of weighing and sorting comparatively small articles such, for example, as the blocks or pieces into which glass plate is commonly cut for filling the moulds used in forming opthalmic lens blanks, but the invention is, of course, capable of a wide variety of other useful applications.

Generally speaking, the present machine comprises a rotary frame carrying one or more weighing mechanisms the material holder or platform of which assumes different positions of elevation for different weights of material imposed. The rotation of the frame carries the material holder past a series of receptacles provided with discharging actuators for the material holders arranged at different elevations corresponding to different positions of the holders and weights of material carried thereby. As a holder passes an actuator positioned to correspond with its weight of material carried, the holder is actuated to discharge its contents into a corresponding one of the series of receptacles. Referring more particularly to the drawings, the machine is shown as comprising, preferably, a main frame including a circular table 10, Figures 1 and 2, supported on legs or standards 11. Carried at the circumference of table 10 is a substantially annular extension 12 having spaced indented portions or recesses 13 in its periphery for the receptacles hereafter described into which the portions of material or glass blocks are sorted. Table portion 12 has formed in its upper surface a circular raceway 14 for a plurality of rollers or balls 15 on which is carried the annular periphery or rim 16 of a wheel-like rotary frame 17 having a hub portion 18 depending through an opening at the center of table 12. Below the table, hub 18 carries a worm gear 19 meshing with a worm 20 on a shaft 21 supported in suitable bearings on the main frame and extended at one end beyond the latter on which end is fixed a pulley 22. Rotation of the pulley by any suitable driving means serves to rotate frame 17 which carries at its periphery one or more weighing mechanisms presently to be described. The latter automatically weigh the material or articles and distribute the same according to weight into corresponding receptacles provided therefor.

The weighing mechanisms carried by the rotary frame, of which in the present instance a considerable number are provided to increase the speed and capacity of the machine, are all similar in construction, so that a description of one will suffice. Each of these weighing mechanisms, then, comprises a pair of spaced standards 23, Figures 5 and 6, preferably supported by a block 24 fixed on the rotary frame and united at their upper ends in the form of a loop. Pivotally supported at their ends on trunnions 25 extending inwardly from standards 23 are upper and lower hub members 26 and 27, respectively, on which the weighing linkage is supported. Fixed to the upper hub member 26 is a lever 28 extending on opposite sides of member 26, to the outer end of which is pivotally connected a vertically arranged link 29. The lower end of the latter has a member 30 fixed thereon forming part of a frame on which the material holder or weighing pan or platform is carried. Member 30 is pivotally engaged at its ends by trunnions 31 projecting inwardly from the arms of a yoke 32 carried by the ends of a pair of spaced links 33 fixed at their other ends to the lower hub member 27.

The material or article holders are supported on a frame comprising, in addition to member 30, an arm 34 extending outwardly from the latter on which and on the member 30 are carried trunnions 35 pivotally supporting the holder proper, or pan 36. The latter, as shown, is in the present instance in the form of a plate having at its inner and rear sides flanges 37 and 38, respectively, for retaining the material thereon. The shape of the holder facilitates the placing of an article thereon from the outer side and the discharging of the same therefrom at the forward side by a tilting movement of the holder on its pivotal axis.

The weight of the weighing linkage and parts described is preferably neutralized by a counterbalance or weight 39 adjustably mounted on the inner end of lever 28. Since the latter, as shown in Figures 2 and 3, remains in a substantially horizontal position during operation, this counter-balancing means has a negligible influence on the weighing operations of the linkage. The latter are effected by an adjustable weight 40 slidably mounted on an arm 41 extending in a generally downward direction from the upper hub member 26. As shown in Figures 2 and 3, the weight 40, in the upper or empty position of the holder, depends substantially vertically from the hub member, so that in this position it has little effect in resisting the turning movement of the latter during the descending movement of the holder. As shown in Figure 3, however, as the holder is moved downwardly by the weight of material placed thereon, the weight 40 is swung outwardly and upwardly in a direction to progressively increase the effective torque thereof acting to resist turning movement of hub member 26. The material holder 36 is thus moved downwardly by the weight of material placed thereon to a greater or less extent depending upon the weight of the material. In other words the greater the weight of material on the holder, the farther the latter descends before the weight 40 is moved sufficiently outwardly to balance the same and of course the effect of the weighing member 40 depends upon its radial distance from hub 26 which may be varied by sliding the member on the arm to adjust and control the different positions of elevation assumed by the holder for different weights of material.

It is to be noted that links 28, 29 and 33 form with the standard 23ª parallel motion linkage and link 29 is maintained vertical and the material holder in descending always follows a given path in which, as later explained, is located actuating means for discharging the holder. With this arrangement, the holder is maintained horizontal and the weight of a given article or quantity of material produces the same positioning effect on the holder regardless of its particular location on the latter.

As already stated, the receptacles into which the material or articles are distributed are arranged in spaced relation about the periphery of the rotary frame, comprising, preferably, an upper portion 42 open at its top and bottom and fixed as described in the indentations 30 in the periphery of the stationary table. Removably supported on brackets 43 of any suitable construction on the main frame are receptacle portions 44 having an open top through which the material descends from the lower end of the upper receptacle portion 32. Receptacle portions 44 may thus be detached for disposing of the sorted articles. Both of the receptacle portions are preferably provided with suitably padded baffle plates 45 to retard and silence the fall of the material.

The means for automatically discharging a loaded holder 36 into that one of the receptacles 42 corresponding to the weight of the material carried by the holder comprises, preferably, an actuator or tripping device in the form of a rod 46 projecting upwardly adjacent each receptacle and adjustably supported in a sleeve 47 on the table. The upper end of the rod is formed with a laterally extending finger 48 for cooperation with a depending finger 49 on the material holders 36. The tripping devices or actuators are adjusted at progressively increasing elevations, as shown in Figure 7, in the direction of rotation of frame 17, so that the material holders having light loads pass over the foremost lower actuators for coaction with higher ones farther along, while the heavily loaded and depressed holders have their depending fingers 49 engaged by one of the lower actuators 48 corresponding in position or elevation to the position of the holder and the weight of material carried thereby. When the holder is thus engaged by an actuator, it is swung on its pivotal axis as illustrated in Figure 7, so that the contents thereof are discharged into the receptacle corresponding to the engaging actuator, which is the proper receptacle for the weight of material corresponding to the position of the holder causing it to engage such actuator. The holders are eccentrically pivoted so that they tend to maintain and to return after discharge to their normal carrying position. Thus as the rotary frame and weighing mechanisms carried thereby are rotated, the material placed on the holders is automatically weighed and separated or sorted according to weight by discharge, as described, into the proper receptacles which may be conveniently marked with the weight of the material or articles discharged into the same. By adjusting the position of the weights 40 and of the actuators 48 adjacent the receptacles, the machine may be adapted to handle a wide range of weights of material and to separate or sort the same with a high degree of accuracy.

The material or articles to be weighed may be supplied to the holders in any suitable manner, the machine being intended in the present instance for the feeding of the material by hand. Thus the operator may occupy a position corresponding substantially to the empty recess 50 in the periphery of the table as shown in Figure 1, and deposit the material or articles to be weighed on the holders as the latter pass during rotation of the frame 17. Guiding means are preferably provided adjacent this position to retard the descending movement of the loaded holders and cause them to move directly to their proper elevations without the oscillating movements which might otherwise occur. Such guiding means comprises in the present instance a rail 51 having a portion 52 inclined gradually downwardly with which the outer ends of the link arms 33 engage during the rotation of the weighing means in the manner described. The holders are thus steadied in their movement to position corresponding to the weight of the contents carried so that they are brought to rest in this position before passing the first of the series of receptacles. There is also preferably provided a guide rail 53 extending through the remainder of the path of movement of the holders to prevent the latter from descending far enough under an exceptionally heavy load to cause the holder to engage with any part other than the actuating finger 48, thus preventing possible injury to the mechanism.

In operation the machine is first set up by the adjustment of the weights 40 of the material holders and the tripping actuators 48 of the receptacles, to accommodate the range of weights of material desired to be handled, the receptacle fingers 48, of course, being arranged at progressively increasing elevations to determine the progressively increasing weights of material to be discharged into the different successive receptacles. After such adjustment, with the rotary frame and weighing mechanisms carried thereby in rotation as described, the material or articles to be weighed are fed to the holders at the described point in the path of rotation of the same. The loading of the holders in this manner causes them to move, under the control of the guide described, directly to positions of elevation corresponding to the weights of the material imposed and each holder moves around the table until it reaches an actuating finger corresponding in elevation to its own position and weight of material when the holder is swung pivotally by such finger and the holder contents is discharged into a receptacle adjacent and corresponding to the actuating finger. Thus each weighing mechanism automatically selects and cooperates with the proper discharging means and receptacle corresponding to its imposed weight of material, returning thence to the starting point for reloading. Due to its simple and practical form of construction and the effective adjustments provided, the machine operates reliably with a high degree of accuracy and may be driven at a considerable speed. These features, and the fact that but a single operator is required, render the machine economical in character, both from the point of view of manufacture, and of operation.

We claim as our invention:

1. In a weighing and sorting machine, the combination of weighing means comprising a material holder, a plurality of pivotally connected links permanently secured at each point of connection and carrying said holder and provided with means for resisting movement of the latter in proportion substantially to the weight of material supported thereby, said linkage being arranged to transmit the weight of the material uniformly in all positions of the material on the holder, a plurality of receptacles provided with means arranged differentially relative to one another for transferring material to said receptacles from said holders in different positions of the latter, and mechanism for moving said weighing means past said receptacles to bring said parts into selective cooperation with said holders.

2. In a weighing and sorting machine, the combination of weighing means comprising a material holder, mechanism including a plurality of vertically movable connected links, one of which is adapted to pivotally support said holder in horizontal relation for movement to a plurality of vertically spaced parallel positions and provided with means for positioning the latter differentially in accordance with the weight of material carried thereby, a plurality of receptacles having parts positioned differentially corresponding to different positions of said holder for discharging the contents thereof into the respective receptacles, and mechanism for moving said weighing means past said receptacles to bring said parts and holder into selective cooperation.

3. In a weighing and sorting machine, the combination of weighing means comprising a material holder, pivotally connected links permanently connected to form a parallelogram supporting said holder and provided with means for positioning the same differentially in accordance with the weight of material carried thereby, a plurality of receptacles having parts positioned differentially corresponding to different positions of said holder for discharging the material into the respective receptacles, and mechanism for moving said weighing means and receptacles relatively to one another to bring said holder and parts into selective cooperation.

4. In a weighing and sorting machine, the combination of a rotary frame, a plurality of vertically movable weighing means carried thereby each comprising a material holder, and parallel motion mechanism pivotally supporting said holder in uniformly horizontal position during vertical movement to different elevations corresponding to the weight of material carried, a plurality of receiving means arranged in spaced relation about the periphery of said rotary frame, and actuators adjacent said receiving means arranged at different elevations relatively to one another for effecting discharge of material from said holders during rotation of the frame to respective ones of said receiving means corresponding to the weight of material carried.

5. In a weighing and sorting machine, the combination of a rotary frame, a plurality of weighing means carried thereby each comprising a material holder, and parallel motion mechanism movable vertically and provided with adjustable balancing means for supporting said holder in different horizontal positions during vertical movement corresponding with the weight of material carried thereby, said holders being supported by said mechanism for movement on the latter to material discharging position, a plurality of receiving means arranged in spaced relation about the periphery of said frame, and actuators adjustably arranged adjacent said receiving means in relatively different positions for effecting movement of said holders during rotation of said frame to discharge the material carried by each holder into a receptacle corresponding to its weight.

6. In a weighing and sorting machine, the combination of a rotary frame, a plurality of weighing means carried thereby each comprising a material holder and pivotally connected links forming a permanent parallelogram provided with adjustable weight means supporting said holder for vertical movement to different horizontal positions corresponding to the weight of material carried, a plurality of receiving means arranged in spaced relation about the periphery of said frame, and actuators adjustably supported adjacent said receiving means at relatively different elevations for engagement with cooperating parts on said holders during rotation of the frame to discharge the material of each holder in the receiving means corresponding to its weight.

7. In a weighing and sorting machine, the combination of a stationary frame, a rotary frame carried by the latter and provided with a plurality of spaced standards, a permanently connected system of links carried by each standard with the latter forming one side thereof, a member fixed to the other side of each linkage, a material holder movably supported on each of said members, means controlling movement of said members to dispose said holders at different elevations corresponding to the weight of material carried thereby, a plurality of receptacles arranged on said stationary frame in spaced relation about the periphery of said rotary frame, adjustable actuating fingers for said receptacles arranged at progressively varying elevations corresponding to said different elevations of the holders for automatically moving each holder to discharge the contents thereof into a selected one of said receptacles corresponding to the weight of the contents, and operating means for rotating said rotary frame.

JOHN C. KURTZ.
JOSEPH J. McCABE.